(12) United States Patent
Curran et al.

(10) Patent No.: US 11,614,778 B2
(45) Date of Patent: *Mar. 28, 2023

(54) ANODIZED PART HAVING LOW REFLECTANCE OF VISIBLE AND NEAR-INFRARED LIGHT

(71) Applicant: Apple Inc., Cupertino, CA (US)

(72) Inventors: James A. Curran, Sunnyvale, CA (US); Alan Kleiman-Shwarsctein, Santa Clara, CA (US); Leon J. Garcia, Jr., Mountain View, CA (US)

(73) Assignee: APPLE INC., Cupertino, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/869,120

(22) Filed: May 7, 2020

(65) Prior Publication Data

US 2021/0096604 A1 Apr. 1, 2021

Related U.S. Application Data

(60) Provisional application No. 62/906,642, filed on Sep. 26, 2019.

(51) Int. Cl.
*G06F 1/16* (2006.01)
*G02B 5/20* (2006.01)
*C25D 11/00* (2006.01)

(52) U.S. Cl.
CPC .......... *G06F 1/1656* (2013.01); *C25D 11/005* (2013.01); *G02B 5/208* (2013.01); *G06F 1/1637* (2013.01)

(58) Field of Classification Search
None
See application file for complete search history.

(56) References Cited

U.S. PATENT DOCUMENTS

| 4,111,762 A | 9/1978 | Wade et al. | |
|---|---|---|---|
| 4,589,972 A * | 5/1986 | Pompea | F24S 70/25 205/213 |
| 2010/0243030 A1* | 9/2010 | Yago | H01L 31/03925 257/E31.119 |
| 2012/0171419 A1 | 7/2012 | Russell et al. | |
| 2014/0166490 A1 | 6/2014 | Tatebe et al. | |

(Continued)

FOREIGN PATENT DOCUMENTS

| CN | 104203555 A | 12/2014 |
|---|---|---|
| CN | 105430980 A | 3/2016 |

(Continued)

OTHER PUBLICATIONS

Rhopoint Instruments, "What is a gloss unit?", 2014, p. 1; Accessed at https://web.archive.org.web/20141029040814/http://www.rhopointinstruments.com:80/faqs/what-is-a-gloss-unit/.

(Continued)

*Primary Examiner* — Anthony J Frost
(74) *Attorney, Agent, or Firm* — Dorsey & Whitney LLP

(57) ABSTRACT

This application relates to an enclosure for a portable electronic device. The enclosure includes a metal substrate, and an anodized layer overlaying the metal substrate and including pores having a near-infrared (NIR) light-absorbing material therein, where an average specular reflectance of NIR light that is incident upon an external surface of the anodized layer is less than 3%.

19 Claims, 13 Drawing Sheets

(56) References Cited

U.S. PATENT DOCUMENTS

| | | | |
|---|---|---|---|
| 2014/0346049 A1 | 11/2014 | Khosla | |
| 2015/0368823 A1 | 12/2015 | Curran et al. | |
| 2017/0226651 A1 | 8/2017 | Curran et al. | |
| 2018/0049337 A1* | 2/2018 | Curran | H05K 5/04 |
| 2019/0062939 A1 | 2/2019 | Curran et al. | |
| 2020/0383224 A1* | 12/2020 | Curran | B32B 3/12 |
| 2021/0130974 A1 | 5/2021 | Kim et al. | |

FOREIGN PATENT DOCUMENTS

| | | |
|---|---|---|
| CN | 105849313 A | 8/2016 |
| CN | 107000369 A | 8/2017 |
| CN | 206559776 U | 10/2017 |
| CN | 107438340 A | 12/2017 |
| CN | 108349296 A | 7/2018 |
| CN | 109487315 A | 3/2019 |
| EP | 3088562 A1 | 11/2016 |
| WO | 2013130211 A1 | 9/2013 |
| WO | 2016093816 A1 | 6/2016 |
| WO | 2018045484 A1 | 3/2018 |
| WO | 2018139749 A1 | 8/2018 |

OTHER PUBLICATIONS

"铝基材组织 结构对阳极氧 化铝多孔膜结 构的影响 (Influence of aluminum substrate structure on anodic alumina porous membrane structure)"", 第十一次全国 电化学会议 论文集 (Proceedings of the 11th National Electrochemistry Conference.

* cited by examiner

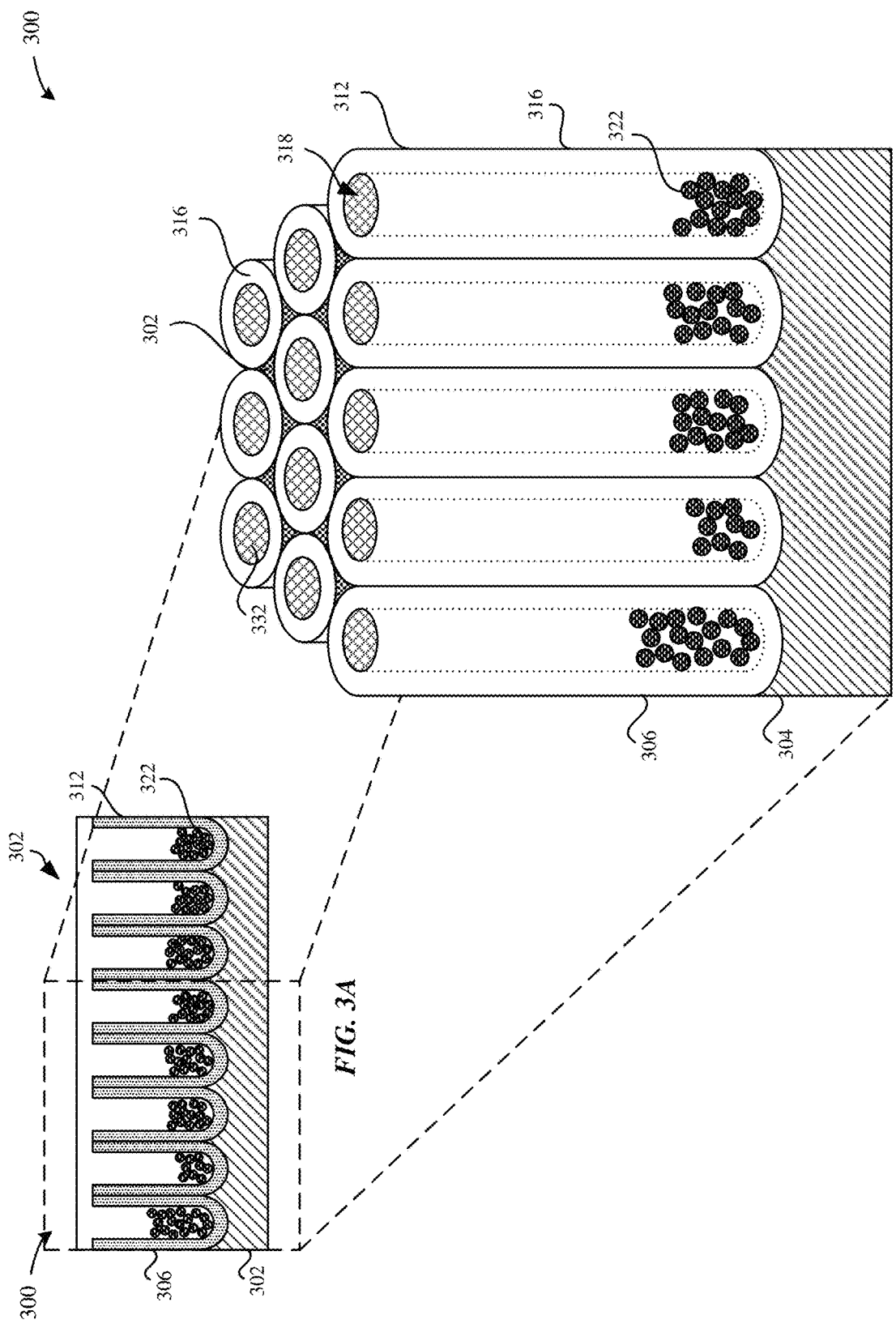

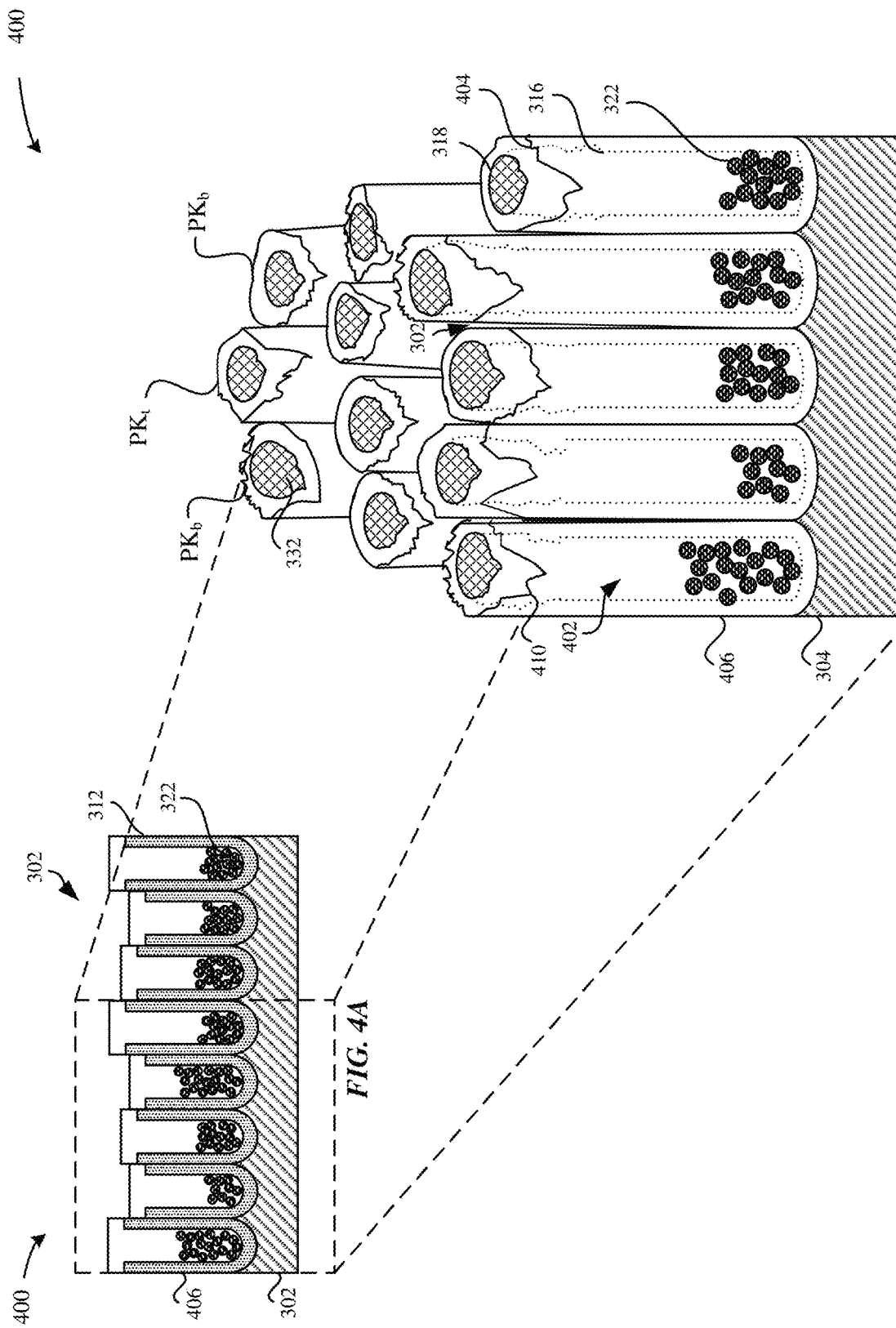

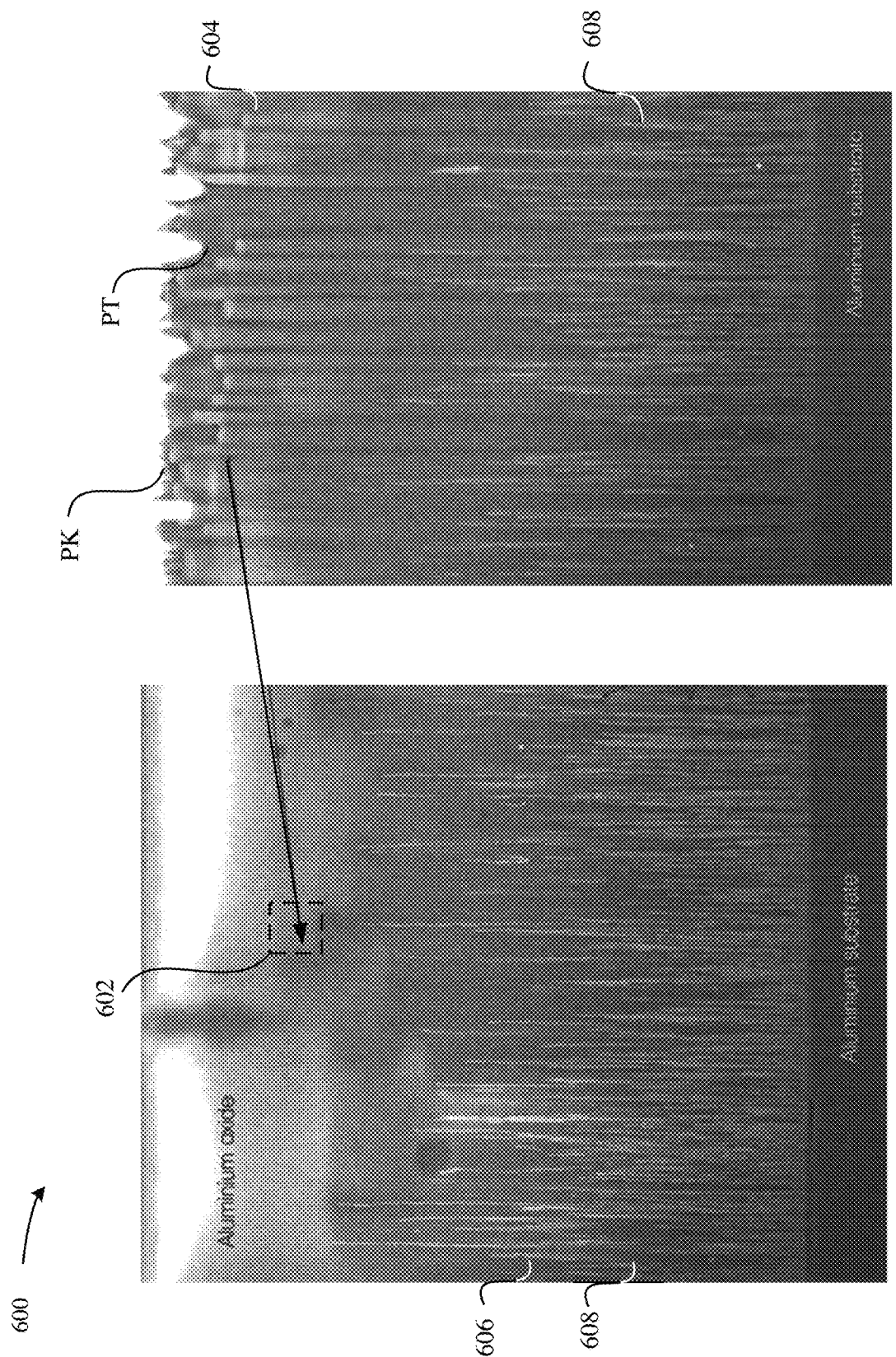

us 11,614,778 B2

ANODIZED PART HAVING LOW REFLECTANCE OF VISIBLE AND NEAR-INFRARED LIGHT

CROSS-REFERENCE TO RELATED APPLICATIONS

This claims priority to U.S. Provisional Patent Application No. 62/906,642, filed 26 Sep. 2019, entitled "ANODIZED PART HAVING LOW REFLECTANCE OF VISIBLE AND NEAR-INFRARED LIGHT," the entire disclosure of which is hereby incorporated by reference. This patent application is related to and incorporates by reference in its entirety for all purposes the following patent applications: U.S. Patent Application No. 62/853,629 entitled "ANODIZED PART HAVING A MATTE BLACK APPEARANCE" by CURRAN et al. filed May 28, 2019.

FIELD

The described embodiments relate generally to techniques for etching an anodized part. More particularly, the described embodiments relate to techniques for electrodepositing a visible light and near-infrared (NIR) light-absorbing material into pores of the etched anodized part so that the etched anodized part exhibits low reflectance of visible and NIR light so as to impart the etched anodized part with a true black appearance.

BACKGROUND

Enclosures for portable electronic devices can include an anodized layer that may be dyed in different colors in order to enhance their cosmetic appeal to consumers. However, certain colors are far more difficult to achieve than others. In particular, attempts by consumer electronic device manufacturers to achieve a true black color have fallen short. Moreover, certain electronic components (e.g., optical sensor) may include anti-reflective coatings that would benefit from having a true black color to minimize the amount of stray visible and near-infrared (NIR) light that is detected by the optical sensor.

SUMMARY

The described embodiments relate generally to techniques for etching an anodized part. More particularly, the described embodiments relate to techniques for electrodepositing a visible light and near-infrared (NIR) light-absorbing material into pores of the etched anodized part so that the etched anodized part exhibits low reflectance of visible and NIR light so as to impart the etched anodized part with a true black appearance.

According to some embodiments, an enclosure for a portable electronic device is described. The enclosure includes a metal substrate, and an anodized layer overlaying the metal substrate and including pores having a near-infrared (NIR) light-absorbing material therein, where an average specular reflectance of NIR light that is incident upon an external surface of the anodized layer is less than 3%.

According to some embodiments, an enclosure for a portable electronic device is described. The enclosure includes a substrate and an anodized layer having a mean thickness value and pores that include a NIR light-absorbing material. The anodized layer further includes a peak that corresponds to a maximum positive deviation from the mean thickness value, and a trough that corresponds to a maximum negative deviation from the mean thickness value, where the peak and trough are separated by 2 micrometers or less.

According to some embodiments, a method for forming an enclosure for a portable electronic device, the enclosure including a metal substrate. The method includes forming an anodized layer that overlays the metal substrate, where the anodized layer includes pores. The method further includes electrodepositing a light-absorbing compound within the pores and forming light-absorbing features on an external surface of the anodized layer by etching the external surface.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 3A-3B illustrate various views of a sealed anodized part having a light-absorbing material, in accordance with some embodiments.

FIGS. 4A-4B illustrate various views of an etched anodized part having a light-absorbing material, in accordance with some embodiments.

FIGS. 6A-6B illustrate various views of an etched anodized part having a light-absorbing material, in accordance with some embodiments.

DETAILED DESCRIPTION

Figure 1:
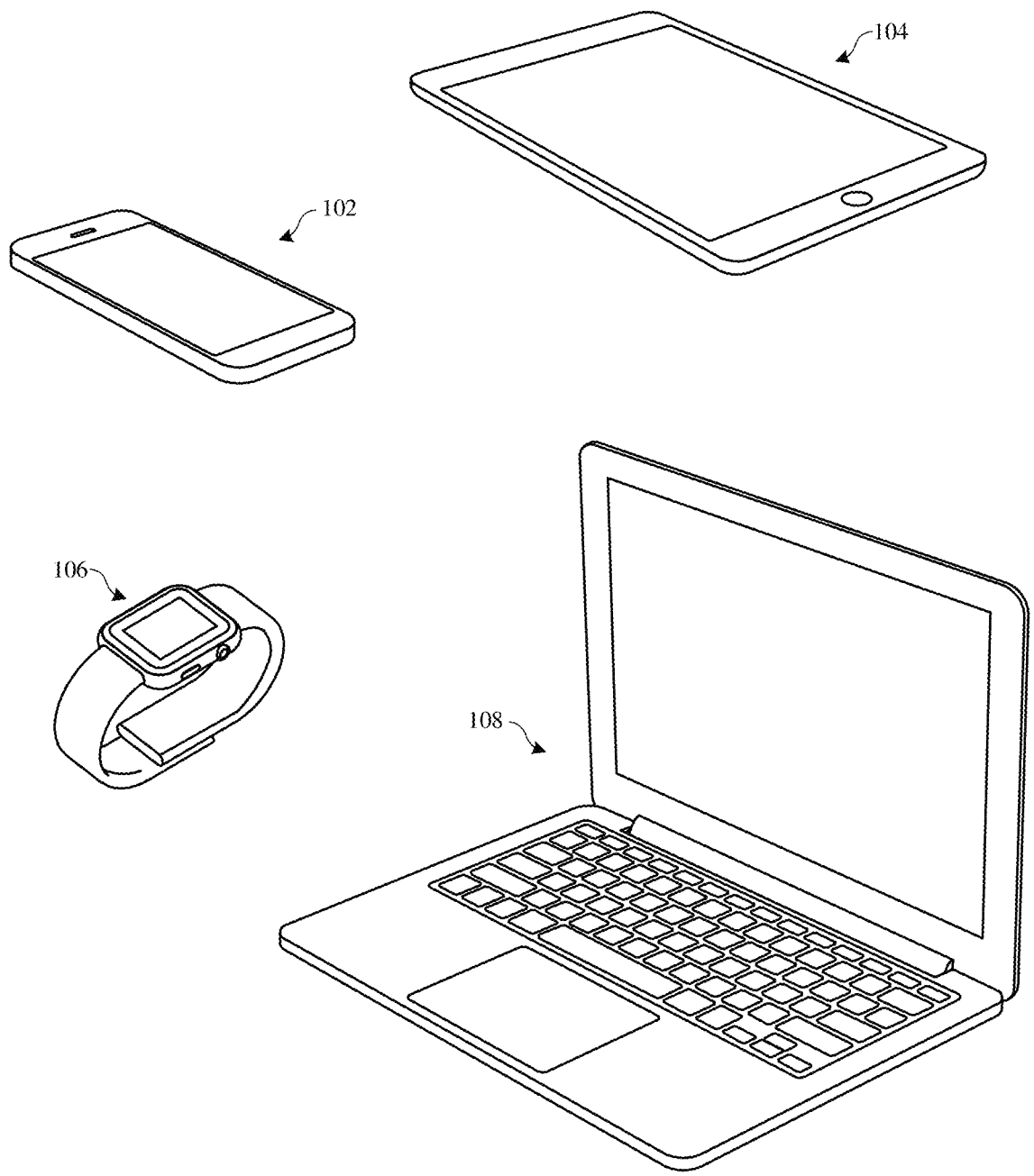
FIG. 1 illustrates perspective views of various portable electronic devices having enclosures that may be processed using the techniques described herein, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Although enclosures formed of anodized aluminum may be dyed in different colors to enhance their cosmetic appeal, attempts by manufacturers to achieve a true black color have fallen short. Additionally, certain electronic components (e.g., optical sensor) may include anti-reflective coatings that would benefit from having a true black color in order to minimize the amount of stray visible and near-infrared (NIR) light that is detected by the optical sensor. The optical sensor may be capable of sensing NIR light or infrared (IR) light emanating from a physical object (e.g., a person) in order to identify the physical object with reasonable accuracy. Thus, the optical sensor is sensitive to any stray NIR light or IR light, and it would be desirable to eliminate and/or minimize as much stray NIR light as possible. The optical sensor may detect NIR light that incident upon and/or adjacent to the optical sensor, which may significantly skew the accuracy of the identification of the physical object sensed by the optical sensor.

The embodiments described herein set forth techniques for etching an external surface of the anodized layer to form light-absorbing features that absorb generally all visible light and NIR light that is incident upon the external surface. Additionally, nanotubes of the anodized layer may also include light-absorbing material that augments the visible and NIR light-absorbing capabilities of the light-absorbing features. The light-absorbing material is electrodeposited within the nanotubes of the anodized layer. As a result, the external surface of the anodized layer is characterized as having a low gloss, matte finish with a true black color. The anodized layer can be perceived as having a similar level of darkness or blackness as a black hole, such as the black hole at the core of M87.

As used herein, the terms anodic film, anodized film, anodic layer, anodized layer, anodic oxide coating, anodic layer, anodic oxidized layer, metal oxide layer, oxide film, oxidized layer, and oxide layer can be used interchangeably where appropriate. In one example, an anodized layer can result from an electrochemical anodization process of aluminum or an aluminum alloy. It should be noted that the processes for forming an anodized layer and a metal oxide layer may be different. As used herein, the terms part, layer, segment, and section can also be used interchangeably where appropriate.

According to some embodiments, an enclosure for a portable electronic device is described. The enclosure includes a metal substrate, and an anodized layer overlaying the metal substrate and including pores having a near-infrared (NIR) light-absorbing material therein, where an average specular reflectance of NIR light that is incident upon an external surface of the anodized layer is less than 3%.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates various portable electronic devices that can be processed using the techniques as described herein. The techniques as described herein can be used to process metallic surfaces of enclosures of the portable electronic devices. In some examples, the enclosures can include at least one of metal, a metal alloy, a polymer, or a thermoplastic. In some examples, the techniques described herein may be used to color metallic surfaces by causing color particles (e.g., water-soluble pigments, etc.) to become absorbed within the metallic surfaces. In some examples, the techniques described herein may be used to seal nanotubes of anodized layers such as to prevent external contaminants from reaching the underlying metal substrate via the nanotubes. Additionally, sealing the nanotubes also prevents the color particles from leaching out of the anodized layer.

FIG. 1 illustrates exemplary portable electronic devices including a smartphone 102, a tablet computer 104, a smartwatch 106, and a portable computer 108. These exemplary portable electronic devices include electronic components that may be carried by enclosures imparted with a true black appearance by utilizing the techniques described herein. Surface(s) of the enclosures of these portable electronic devices may assume any number of desired surface geometries and surface finishes. In some examples, the enclosures may have a three-dimensional structure having a height, width, and depth, and any type of geometry. In particular, the enclosures is characterized as rectangular, polygonal, circular, beveled edges, angular edges, elliptical, etc.

These exemplary portable electronic devices may be capable of using personally identifiable information that is associated with one or more users. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

According to some embodiments, the exemplary portable electronic devices can include enclosures having external surface with a true black appearance so that the external surface absorbs generally all visible light and NIR light that is incident upon the external surface. For example, the smartphone 102 may include a light-detection component (e.g., optical sensor) at a notch that is capable of detecting NIR light and infrared (IR) light in order to identify a physical object. Thus, it may be beneficial to minimize and/or eliminate absorption of visible light, NIR light, and IR light. In some examples, the enclosures include internal surfaces that have the true black appearance. In some examples, these enclosures include lens barrels of cameras that are capable of emitting and/or detecting NIR and IR light.

In another example, the enclosure of the portable computer 108 is a heat dissipater, such as a heatsink, that has a true black color to efficiently draw heat and dissipate heat generated by operational components (e.g., battery, processor, etc.) carried within the portable computer 108. An enclosure that appears black is capable of absorbing visible light, NIR light, and IR light; therefore, converting these forms of light into heat. Accordingly, implementing the techniques described herein for coloring an anodized layer a true black can cause the enclosure to absorb a greater amount energy and promote cooling from within. As described herein, a true black color may refer to an L* value of <10 or an L* value of <5.

As will be described herein, the etched surface of the anodized layer of these enclosures have light-trapping features (also referred to as light-absorbing features) capable of absorbing generally all visible light and NIR light incident thereupon. Additionally, whatever visible light and NIR light not absorbed by the light-absorbing features is diffusely reflected. As a result, the etched anodized part is characterized as having a matte, low gloss finish.

The anodized layer may have sufficient hardness such that the anodized layer functions as a protective coating to protect the metal substrate, for example, when these portable electronic devices are dropped, scratched, chipped, abraded, or exposed to various corrosive contaminants. In some examples, the anodized layer includes pores (also referred to as nanotubes herein) that extend through a portion of the anodized layer. The nanotubes extend from an external surface of the anodized layer and terminate at a bottom surface/terminus surface. The anodized layer may be separated from the underlying metal substrate by a non-porous barrier layer. The anodized layer may correspond to an anti-reflective coating that is part of an enclosure that encloses or is adjacent to an electronic component that is sensitive to visible light and/or NIR light.

The nanotubes of the anodized layer are capable of receiving a light-absorbing material. The light-absorbing material can imbue the anodized layer with a diffuse dark grey or black color due to the amount of visible light and NIR light that is absorbed by the light-absorbing material. The nanotubes of the anodized layer may have a diameter between about 20 nm to about 40 nm, which is large enough to receive the light-absorbing material. In some examples, the light-absorbing material is an electrodeposited metal. Several parameters may influence and control uptake of electrodeposited materials into the nanotubes such as concentration of the electrodeposited materials and duration of electrodeposition time as will be described in greater detail herein.

In some examples, the color of the anodized layer may be characterized according to CIE L*a*b* color-opponent dimension values. The L* color opponent dimension value is one variable in an L*a*b* color space. In general, L* corresponds to an amount of lightness. L*=0 represents an extreme black while L*=100 represents white. In general, a* indicates amounts of red color and green color in a sample. A negative a* value indicates a green color, while a positive a* value indicates a red color. Accordingly, samples having a positive a* value will indicate that more red than green is present. In general, b* indicates amounts of blue color and yellow color in a sample. A negative b* value indicates a blue color, while a positive b* value indicates yellow color. Accordingly, samples having a positive b* value will indicate more yellow than blue is present.

According to some examples, anodized parts are characterized according to their specular reflectance of visible light and NIR light. As described herein, specular reflection refers to reflection of each incident light ray at the same angle to the surface normal as the incident light ray.

FIGS. 2A-2H illustrate cross-sectional views of a process for forming an etched anodized part having a visible light and NIR light-absorbing material, in accordance with some embodiments. In some embodiments, a metal part 200 that is being processed has a near net shape of a final part, such as the enclosures of the portable electronic devices 102, 104, 106, and 108.

Figure 2A:
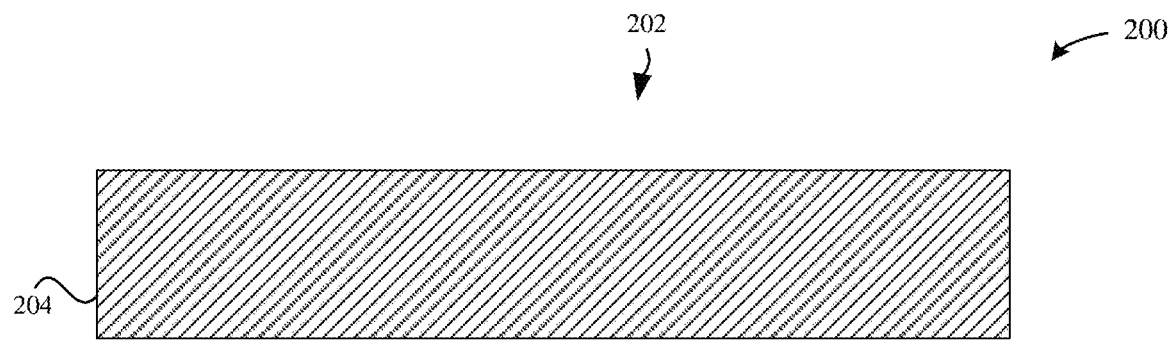
FIGS. 2A-2H illustrate cross-sectional views of a process for forming an etched anodized part having a light-absorbing material, in accordance with some embodiments.

FIG. 2A illustrates the metal part 200 prior to undergoing an anodization process. In some examples, the metal part 200 may correspond to a metal substrate 204. The metal substrate 204 may have any thickness that is suitable for providing sufficient strength, hardness and rigidity to protect electronic component(s) that are carried within the portable electronic device and to protect brittle components (e.g., ceramic, glass, etc.) of the enclosure. The metal substrate 204 may be subject to one or more pre-anodization processes, such as at least one of polishing, blasting, buffering, cleaning, and the like. For example, blasting the external surface 202 of the metal substrate 204 can impart a target roughness to the external surface 202. In another example, chemically polishing the external surface 202 can increase the glossiness of the external surface 202.

Figure 2B:
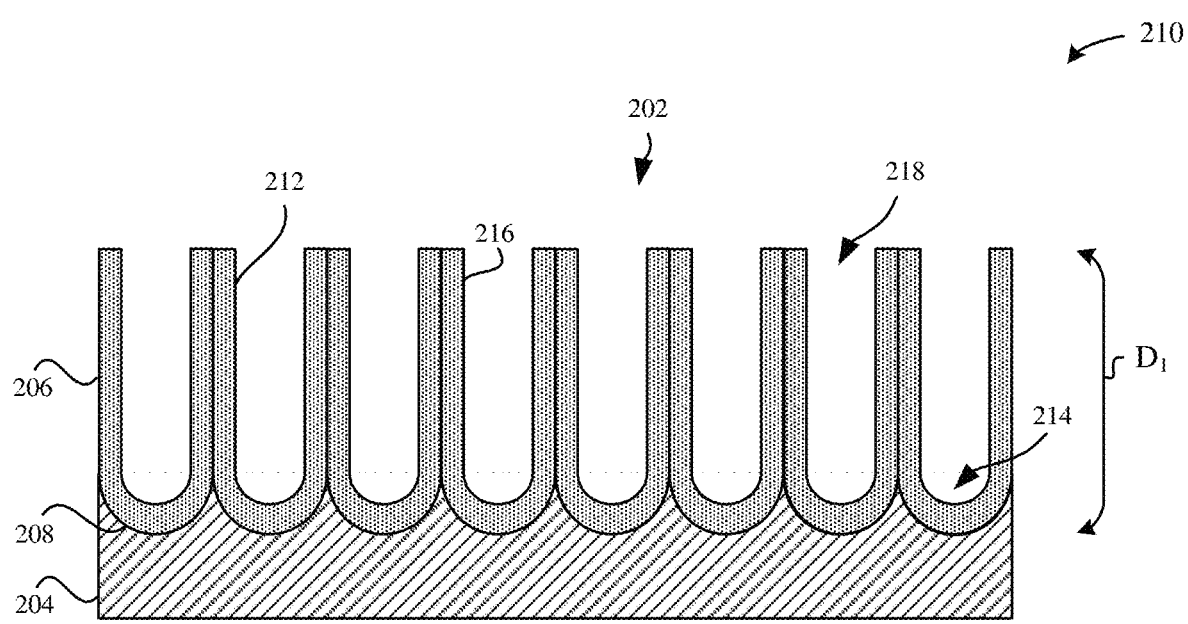

FIG. 2B illustrates an anodized part 210 subsequent to an anodization process, in accordance with some embodiments. The anodized part 210 includes an anodized layer 206 that overlays and is formed from the metal substrate 204. In some examples, the anodization process including exposing the metal substrate 204 to a sulfuric acid solution (e.g., 200 g/l at 1 to 3 A/dm$^2$). The anodized layer 206 is separated from the metal substrate 204 by a barrier layer 208. In some embodiments, the external surface 202 of the anodized layer 206 is parallel to a bottom surface of the metal substrate 204. As a result of the anodization process, a portion of the metal substrate 204 is converted to the anodized layer 206. According to some examples, the anodized layer 206 has a thickness between about 1 micrometers and several tens of micrometers. In some examples, the thickness is between about 5 micrometers and about 15 micrometers.

According to some embodiments, the anodized layer 206 includes nanotubes 212 that extend from the external surface 202 towards the metal substrate 204. Each of the nanotubes 212 include pore walls 216 that define an internal volume. The nanotubes 212 have a generally columnar shape that is elongated in a direction generally perpendicular to a central plane of the external surface 202. The nanotubes 212 may terminate at a terminus surface 214. The nanotubes 212 include openings 218 that may be sealed via a sealing process, as described in greater detail herein.

FIG. 2B illustrates that the nanotubes 212 have a length ($D_1$). As will be described herein, upper portions of the nanotubes 212 may be etched during an etching process so as to reduce the length ($D_1$) of the nanotubes 212. In some examples, the length ($D_1$) is at least 5 micrometers or greater. In some examples, the length ($D_1$) is several micrometers.

Figure 2C:
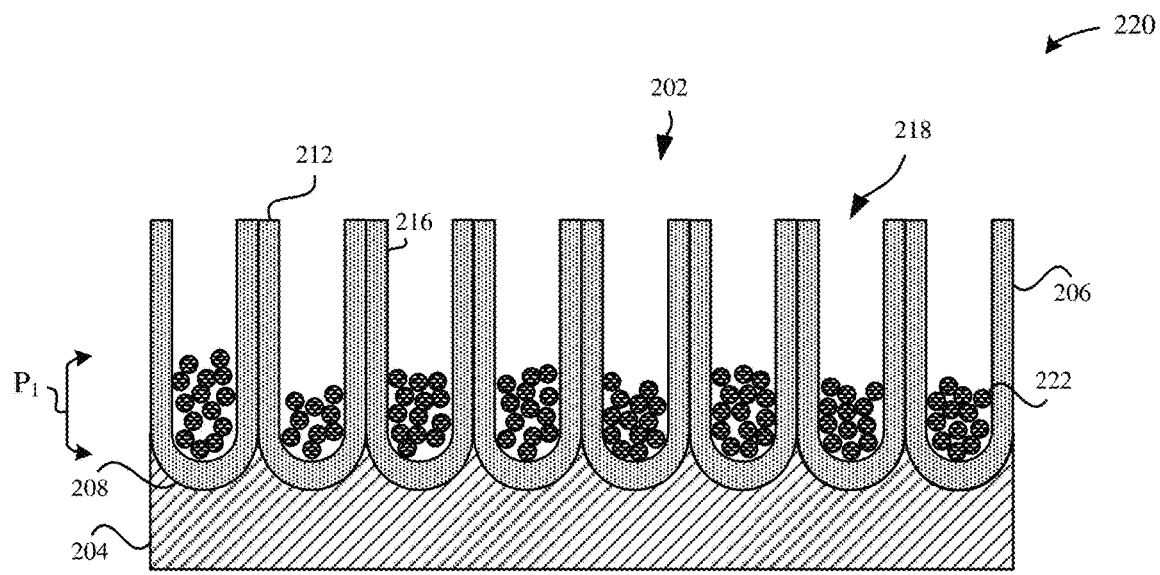

FIG. 2C illustrates an colored anodized part 220 subsequent to the anodized part 210 being exposed to an electrodeposition process, in accordance with some embodiments. As illustrated in FIG. 2C, the colored anodized part 220 includes nanotubes 212 that include a light-absorbing material 222 therein. The light-absorbing material 222 is capable of absorbing generally all visible light and nearly all NIR light so as to impart a black color. As defined herein, visible light corresponds to a wavelength range between 400 nm to 700 nm. As defined herein, NIR light may correspond to a wavelength range between 750 nm to 1000 nm. In some examples, the light-absorbing material 222 may also be referred to as an NIR-absorbing material.

In some examples, the light-absorbing material 222 is a metal that is capable of absorbing NIR light, such as elemental silver (Ag), copper (Cu), cobalt (Co), nickel (Ni) or tin (Sn). For example, a tin sulfate electrolytic solution may be electrically applied in order to electrocolor the anodized part 210 with tin. The light-absorbing material 222 fills the nanotubes 212 from the terminus surface 214 and upwards, resulting in an array of needle-like metal nanofilaments that fill portions of the anodized layer 206. The light-absorbing material 222 may fill the nanotubes 212 to a depth ($P_1$). The light-absorbing material 222 may fill the nanotubes 212 to varied depths. In some examples, the depth ($P_1$) is less than the length ($D_1$).

Relative to organic black dyes, metal electrodeposits provide improved absorbance in the NIR range. For example, while organic black dyes may be capable of reflecting up to 5% of visible light, these organic black dyes reflect a large amount of NIR light. In particular, organic black dyes may reflect greater than 90% of NIR light in the 920 nm to 960 nm range. However, in spite of these improvements, metal electrodeposits may not be sufficient enough to match the performance of black paint to achieve a true black appearance. For instance, metal electrodeposits can reduce reflectance of NIR light in the 920 nm to 960 nm range to at most 8%.

Figure 2D:
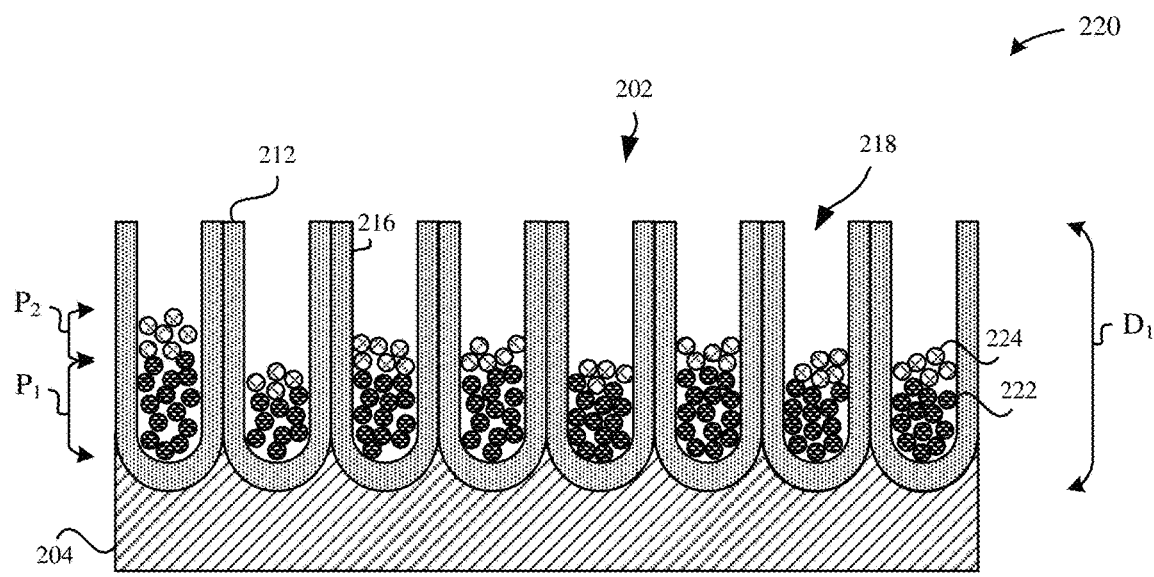

FIG. 2D illustrates the colored anodized part 220 subsequent to an electrocoloring process, in accordance with some embodiments. In particular, the colored anodized part 220 of FIG. 2C may be further subjected to an optional electrocoloring process that involves depositing one or more NIR absorbent dye 224 within the nanotubes 212. The NIR absorbent dye 224 may correspond to a dye particle. The NIR absorbent dye 224 augments the absorption of NIR light by the light-absorbing material 222. As illustrated in FIG. 2D, the NIR absorbent dye 224 may fill the nanotubes 212 to a depth ($P_2$). The IR absorbent organic dye particle 224 may overlay the light-absorbing material 222. In some examples, the depth ($P_2$) is less than the depth ($P_1$). Furthermore, as illustrated in FIG. 2D, the combination of the light-absorbing material 222 and the NIR absorbent dye 224 that fill the nanotubes 212 is less than the length ($D_1$) of the nanotubes 212. Beneficially, this permits for an upper portion of the anodized layer 206 to be etched so as to form a textured surface, as will be described with reference to FIGS. 2G-2H.

Etching the external surface 202 of the colored anodized part 220 in combination with depositing at least one of the light-absorbing material 222 or the NIR absorbent dye 224 to fill the nanotubes 212 may impart the anodized layer 206 with a true black color. As described herein, the term "true black" may refer to an anodized part having a color with an L* value that is less than 5 using a CIE L*a*b* color space. Additionally, the term "true black" may also refer to an anodized part that absorbs approximately 99% or greater of visible light. Additionally, the term "true black" may refer to an anodized part that absorbs approximately at least 97% or greater of NIR light.

It should be noted that solely electrocoloring and/or dyeing the anodized layer 206 with the light-absorbing material 222 and the NIR absorbent dye 224 is insufficient to impart a true black color to the anodized layer 206. Indeed, at best, the color of the colored anodized part 220 is no less than an L* value of about 20. For example, the colored anodized part 220 has an L* value between 20 to 30. In other words, merely electrodepositing or dyeing the anodized layer 206 is insufficient to impart the anodized part 210 with a true black color. In order to achieve a true black color, the anodized part (e.g., the sealed colored part 240) must be subjected to an etching process, as will be described herein.

According to some embodiments, there will be a higher concentration of the light-absorbing material 222 and the NIR absorbent dye 224 at the upper portion of the nanotubes 212 or along outer extremities of the nanotubes 212. As described herein, upper portion of the nanotubes 212 refers to a reduced length of the nanotubes 212 from the external surface 202 and less than 50% of the length ($D_1$) of the nanotube 212. During the electrodepositing and electrocoloring processes, the light-absorbing material 222 and the NIR absorbent dye 224 can bind to sites along the pore walls 216.

Figure 2E:
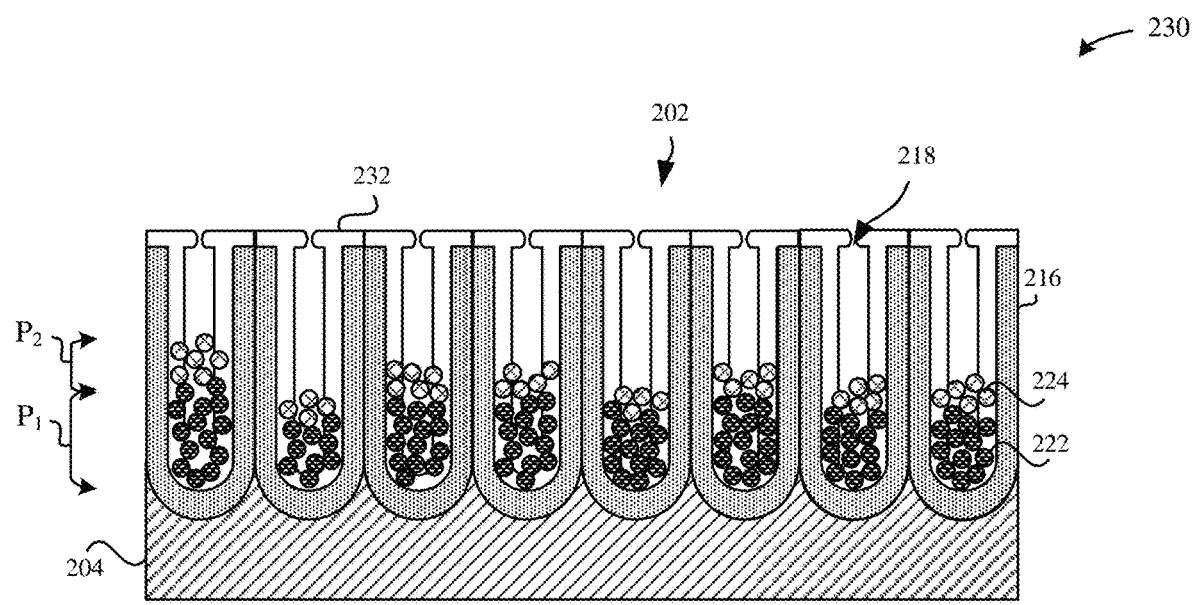
Figure 2F:
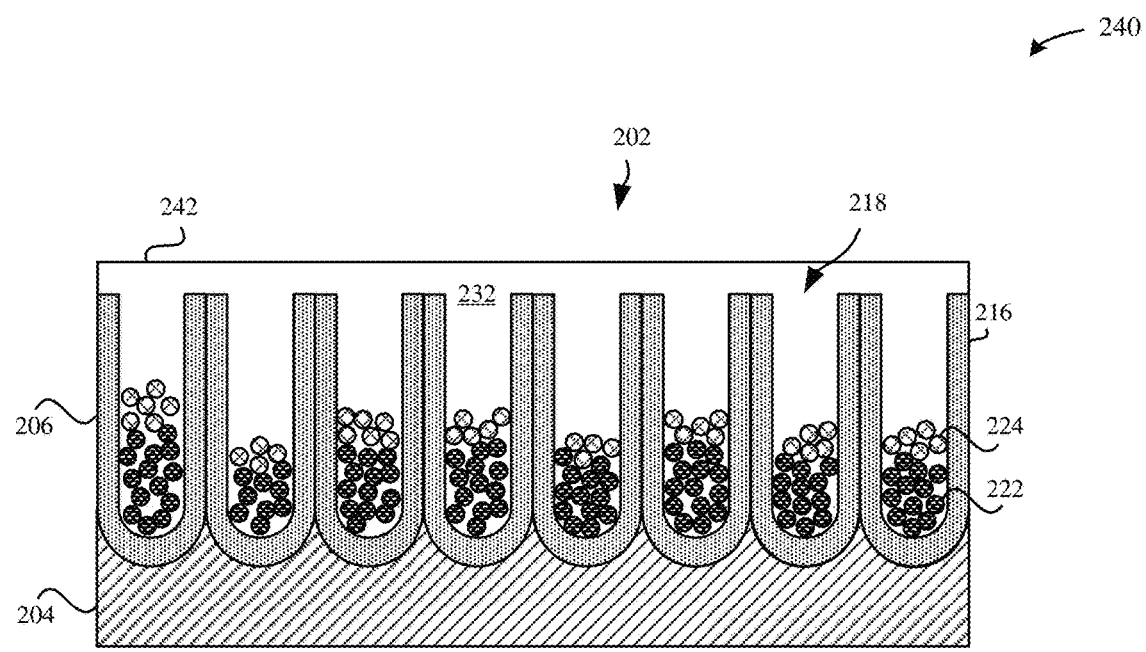

FIGS. 2E-2F illustrate cross-sectional views of a process for forming a sealed anodized part 230, in accordance with some embodiments. In particular, FIG. 2E illustrates a partially-sealed anodized part 230 subsequent to the colored anodized part 220 undergoing a hydrothermal sealing process. During the hydrothermal sealing process, the colored anodized part 220 is exposed to a sealing solution.

The sealing process involves hydrating the amorphous alumina surfaces of the pore walls 216 to a gel of boehmite ($Al_2O_3 \cdot H_2O$) and/or bayerite ($Al_2O_3 \cdot 3H_2O$) such that the amorphous aluminum material swells and closes the openings 218 of the nanotubes 212. The sealing process may be enhanced by using zinc acetate which additionally precipitates metal hydroxides in the nanotubes 212 and accelerates the sealing process. In some examples, the hydrothermal sealing process may be performed in steam, hot water (e.g., at or near boiling temperature so as to reduce smutting), or at a temperature as low as about 70° C. The hydrothermal sealing process causes precipitation of hydrated aluminum oxide (e.g., boehmite, etc.). In particular, the hydrothermal sealing process causes swelling of the aluminum oxide of the anodized layer 206 while immersed in the sealing solution. Swelling of the aluminum oxide causes the opening 218 to narrow, thereby minimizing external elements from diffusing into the nanotubes 212. Swelling of the opening 218 may also cause oxidized fragments or metal oxide material to be retained within the anodized layer 206. During the hydrothermal sealing process, the alumina (of aluminum oxide) is converted to a hydrated material 232 such as aluminum oxide hydroxides (e.g., boehmite, diaspore, etc.) that results in swelling or volume increase of the oxide surfaces to partially close or partially seal the openings 218 of the nanotubes 212. In some examples, the hydrated material 232 uniformly lines the pore walls 216 of the nanotubes 212.

FIG. 2F illustrates a sealed colored part 240 subsequent to completing the hydrothermal sealing process, in accordance with some embodiments. As a result of the hydrothermal sealing process, the openings 218 of the nanotubes 212 are sealed with a seal 242. The seal 242 is comprised of the hydrated material 232. As a result of sealing the openings 218, the light-absorbing material 222 and/or the NIR absorbent dye 224 are locked within the nanotubes 212. Sealing the openings 218 of the nanotubes 212 is critical to preventing stains, dirt, chemicals, and external contaminants from entering into the nanotubes 212. The seal 242 extends to a depth of several micrometers (e.g., between 3 to 5 micrometers) from the external surface 202.

FIG. 2F illustrates that the nanotubes 212 of the sealed colored part 240 have equal or generally equal lengths. For example, the nanotubes 212 that comprise the anodized layer 206 may have the length ($D_1$). Additionally, the external surface 202 of the sealed colored part 240 is characterized as being generally planar.

Figure 2G:
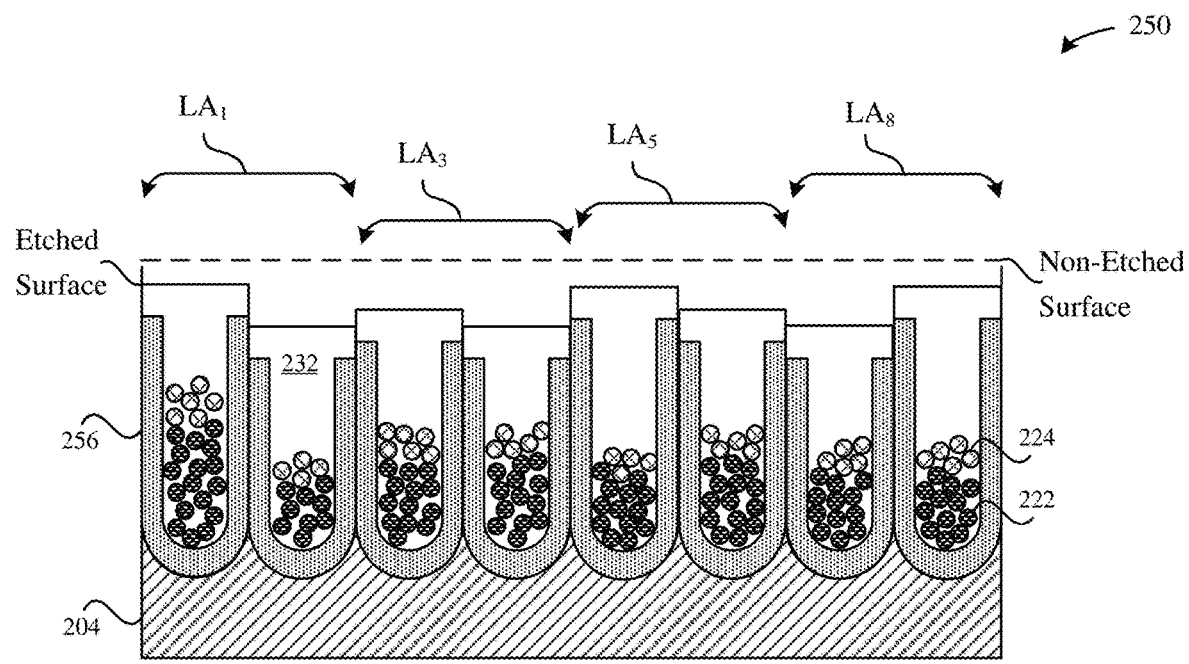
Figure 2H:
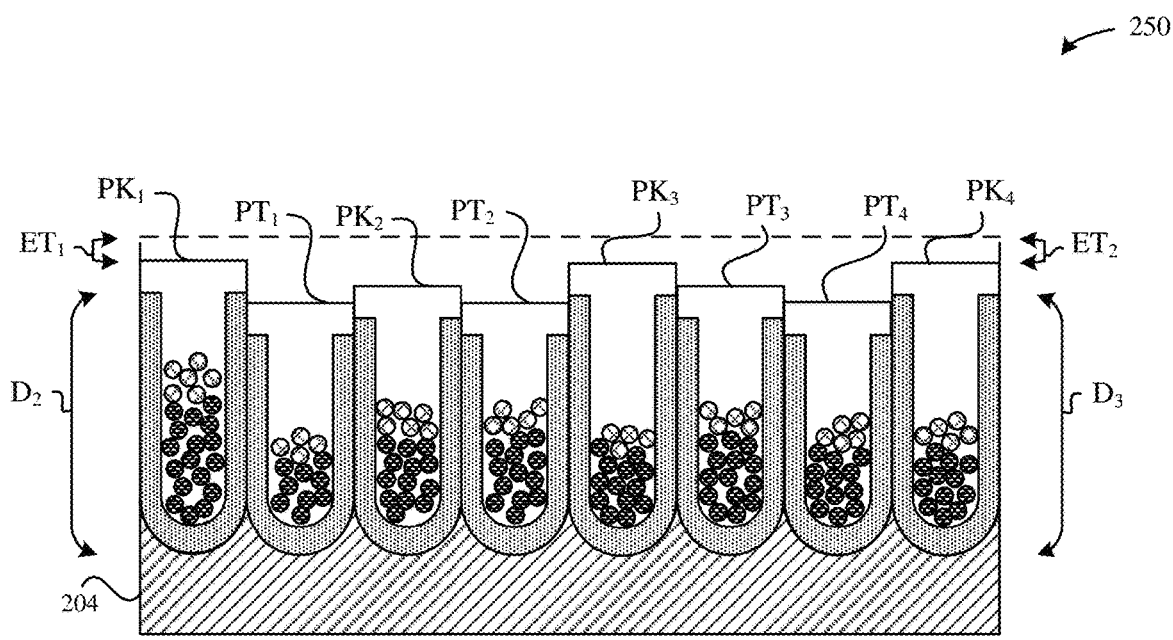

FIGS. 2G-2H illustrate cross-sectional views of a process for forming an etched colored part 250, in accordance with some embodiments. In particular, FIGS. 2G-2H illustrate the etched colored part 250 subsequent to an etching process. In particular, the anodized layer 206 is etched to form an etched anodized layer 256. The light-absorbing material 222 and the NIR absorbent dye 224 are generally not disturbed by the etching process as the light-absorbing material 222 and the NIR absorbent dye 224 are disposed at penetration depths ($P_1$) and ($P_2$), respectively, that are well below the furthest extent of the etching process. For example, the further extent of the etching process is to etch the uppermost 2 micrometers of the upper portion of the nanotubes 212. However, the light-absorbing material 222 and the NIR absorbent dye 224 may be disposed at a depth of 5 micrometers to 10 micrometers or greater from the external surface 202. Moreover, the etching process does not destroy the seal 242; thus, the nanotubes 212 remain sealed so that the light-absorbing material 222 and the NIR absorbent dye 224 remain locked within the nanotubes 212.

In contrast to the external surface 202 of the sealed colored part 240, the external surface 202 of the etched colored part 250 is textured and non-planar. In particular, the etching process is associated with stochastic etching of the pore walls 216 of the nanotubes 212 that causes the nanotubes 212 to have varied heights. The stochastic etching of the pore walls 216 results in the external surface 202 having an extremely fine surface texture. The etched surface texture creates pits and peaks on the micron and sub-micron scale. In some embodiments, the pits and peaks may also be referred to as valleys and peaks. In some examples, tops of the peaks ($PK_t$) are separated from bottoms of the pits ($PT_b$) by no more than 2 micrometers. The peaks and the pits correspond to light-absorbing features.

FIG. 2G illustrates that the external surface 202 of the etched anodized layer 256 includes one or more light-absorbing feature (LA). In particular, FIG. 2G illustrates that the etched colored part 250 includes light-absorbing features ($LA_{1-4}$), where each of the light-absorbing features ($LA_{1-4}$) is defined by at least one pit (PT) and at least one peak (PK). The light-absorbing features may be super-imposed throughout generally the entire external surface 202. According to some embodiments, the pits may also refer to valleys. FIG. 2G illustrates a comparison between the etched external surface of the etched colored part 250 and the non-etched external surface of the sealed colored part 240.

In some embodiments, the light-absorbing feature (LA) is capable of absorbing generally all visible light (e.g., approximately 99% or more) incident upon the external surface 202. In particular, the light-absorbing feature (LA) may trap visible light therein. Using the light-absorbing feature (LA) causes the etched anodized layer 256 to absorb far more visible light than would otherwise be capable in a non-etched anodized part that only includes color particles. Additionally, the combination of the light-absorbing feature (LA) and at least one of the light-absorbing material 222 or the NIR absorbent dye 224 are capable of imparting the etched colored part 250 to absorb at least 97% or more of NIR light. In some examples, the etched colored part 250 reflects less than 3% of NIR light having a wavelength between 920 nm-960 nm. As a result of the electrocoloring and etching, the etched anodized layer 256 is characterized as having an extremely matte black appearance with an L* value of less than 5 using a CIE L*a*b* color space.

Furthermore, the etched anodized layer 256 of the etched colored part 250 may be quantified as having an extremely matte appearance with a gloss unit of <1 as measured at 20 degrees, a gloss unit of <1 as measured at 60 degrees, and a gloss unit of <10 as measured at 85 degrees.

As illustrated in FIG. 2H, the light-absorbing features ($LA_1$) may be defined by ($PT_1$) and ($PK_1$), ($LA_2$) may be defined by ($PT_2$) and ($PK_2$), ($LA_3$) may be defined by ($PT_3$) and ($PK_3$), and ($LA_4$) may be defined by ($PT_4$) and ($PK_4$). The etched anodized layer 256 includes pits ($PT_{1-4}$) that are separated by peaks ($PK_{1-4}$). The tops of the peaks ($PK_{1-4}$) are of varied heights and the bottoms of the pits ($PT_{1-4}$) are of varied depths, then the distance separating the tops of the peaks ($PK_{1-4}$) from the bottoms of the pits ($PT_{1-4}$) is also varied. The separation distance is at least sufficient to cause diffuse reflection of generally all visible light incident upon the external surface 202 that is not absorbed by the etched anodized layer 256. Indeed, it is well understood in the art, that matte appearance is a direct function of the separation distance between tops of the peaks and bottoms of the pits. In particular, diffusion of visible light is caused when a light ray incident upon the external surface 202 is scattered in many different angles instead of a single angle as compared to specular reflection. In other words, the etched anodized layer 256 of the etched color part 250 may be characterized a very low gloss appearance. The etched anodized layer 256 may have a matte appearance, as measured at 85 degrees, of less than 10 gloss units. It should be noted that a true black appearance cannot be achieved with an anodized part having a high gloss appearance because the external surface of a high gloss anodized part specularly reflects a substantial portion of visible light. Accordingly, it may be necessary in some embodiments to etch the external surface 202 of the etched anodized layer 256 to form the pits and peaks.

FIG. 2H illustrates that the nanotubes 212 of the etched anodized layer 256 have varied lengths. FIG. 2H illustrates that the nanotube 212 corresponding to the peak ($PK_1$) has a length ($D_2$) that is less than ($D_1$) and that the nanotube 212 corresponding to the peak ($PK_4$) has a length ($D_3$) that is less than ($D_1$) and ($D_2$). Different amounts of the anodized material are removed from the nanotubes 212 as a result of the etching process. The varied heights of the nanotubes 212 is the result of the etching process that causes between 1-2 micrometers of the nanotubes 212 to be removed. In some examples, each of the nanotubes 212 of the etched external surface 202 have a diameter of about 50 nanometers.

According to some embodiments, the light-absorbing material 222 and/or the NIR absorbent dye 224 occupy up to ⅔ of the length nanotubes 212 of the etched colored part 250. In some examples, the light-absorbing material 222 and/or the NIR absorbent dye 224 fill between ¼ to ⅔ of the length of the nanotubes 212.

In some examples, the etching process involves exposing the sealed colored part 240 to an etching solution at a temperature between 80° C. to 90° C. for a duration between 30 seconds to 60 seconds. In some examples, the etching solution includes about 85% phosphoric acid. One of ordinary skill in the art would understand that an etching time in excess of 60 seconds would lead to degradation of the seal 242 while an etching time of less than 15 seconds is insufficient time to properly form the light-absorbing features that trap visible and NIR light that is incident upon the external surface 202 of the etched colored part 250. It should be noted that the etching process does not actually contact with the light-absorbing material 222 and the NIR absorbent dye 224. Moreover, extending the etching time to greater than 60 seconds does not yield any additional improvements in light absorption over an etching time between 30 seconds to 60 seconds. Extending the etching time also increases the amount of metal oxide material debris on the external surface 202 that must be cleaned and removed. Moreover, further extending the etching time beyond 60 seconds can weaken the structure of the nanotubes 212 and lead to collapse of the nanotubes 212. Additionally, experiments performed in establishing the light-absorbing features (LAF) of this application uncovered that an etching time between 30-60 seconds to an etching depth of no more than 2 micrometers below the external surface 202 of the sealed colored part 240 provided the most optimal light absorption so that the etched colored part 250 has an L* value of less than 5, visible light reflectance of less than 1%, and NIR light reflectance of less than 3%.

FIGS. 3A-3B illustrate various views of a sealed colored part, in accordance with some embodiments. In some examples, FIGS. 3A-3B illustrate a sealed colored part 300 subsequent to an electrocoloring process where a light-absorbing material 322 fills in nanotubes 312 of an anodized part—e.g., the anodized part 210. By way of example, in contrast to the sealed colored part 240, the sealed colored part 300 does not include the NIR absorbent dye 224, as described with reference to FIG. 2D. FIG. 3A illustrates a cross-sectional view of the sealed colored part 300 and FIG. 3B illustrates a magnified perspective view of the external surface of the sealed colored part 300. In some examples, the sealed colored part 300 may include similar structure to the sealed colored part 240 of FIG. 2F except for the NIR absorbent dye 224.

As illustrated in FIG. 3A, the light-absorbing material 322 is filled to varied depths of the nanotubes 312. Thereafter, the light-absorbing material 322 is sealed within the nanotubes 312 by a seal 332. As illustrated in FIG. 3A, the sealed colored part 300 includes generally columnar nanotubes 312 that extend from the external surface 302 to the metal substrate 304. Subsequent to the sealing process, the external surface 302 of the sealed colored part 300 may be characterized as generally planar due to the nanotubes 312 have generally uniform lengths. In some examples, the light-absorbing material 322 may overlay a non-black dye particle within the nanotubes 312.

FIG. 3B illustrates a magnified cross-sectional and perspective view of the sealed colored part 300, in accordance with some embodiments. As illustrated in FIG. 3B, openings 318 of the nanotubes 312 are sealed with a seal 332. Additionally, the nanotubes 312 are separated by knit lines 302. The knit lines 302 may also be filled with the hydrated material 232. Beneficially, the seal 332 extends to a depth of several micrometers (e.g., between 3 to 5 micrometers) that is greater than the depth of the etching process (i.e., no more than 2 micrometers).

The nanotubes 312 include the light-absorbing material 322 that are infused therein such as to impart the anodized layer 306 that is sealed with a predetermined color, such as dark grey (not true black). In some examples, the light-absorbing material 322 is electrodeposited metals (e.g., Sn, Co, etc.). However, merely depositing the light-absorbing material 322 within the nanotubes 312 is insufficient to impart the anodized layer 306 with a true black color. In order to achieve a true black color, the external surface 302 of the anodized layer 306 must also be subjected to an etching process to form light-absorbing features.

FIGS. 4A-4B illustrate various views of an etched colored part 400, in accordance with some embodiments. In some embodiments, the etched colored part 400 is formed by exposing the sealed colored part 300 to an etching process.

FIG. 4A illustrates a cross-sectional view of the etched colored part 400 and FIG. 4B illustrates a magnified perspective view of the etched colored part 400. In some examples, the etched colored part 400 may include similar structure to the etched colored part 250 of FIG. 2G except for the NIR absorbent dye 224.

As illustrated in FIG. 4A, subsequent to the etching process, the external surface 202 of the anodized layer 306 is etched to form an etched anodized layer 406 having a textured and a non-planar surface. In particular, the nanotubes 312 are etched in a stochastic manner such that peaks (PK) and pits (PT) are superimposed on the external surface 302. In particular, the peaks (PK) and pits (PT) correspond to the nanotubes 312 having non-uniform lengths and/or non-uniform heights. The openings 318 of the nanotubes 312 are sealed with a seal 332.

In some examples, the nanotubes 312 of the etched colored part 400 have a length between 10 micrometers to 20 micrometers. During the etching process, up to 2 micrometers of an upper portion of the nanotubes 312 are etched. However, because the seal 332 extends to a depth of 3 micrometers to 5 micrometers below the external surface 202, and therefore the seal 332 remains intact following the etching process.

In some examples, the bottoms of the pits ($PT_b$) may be separated from the tops of the peaks ($PK_t$) by at most 2 micrometers. In some examples, external regions 404 (e.g., the external surface 202) of the sealed colored part 300 is more preferentially etched than internal regions 402. During the etching process, internal regions 402 of the pore walls 316 may be more preferentially etched than the exterior regions 404 of the pore walls 316 due to the hydrated material present along the internal regions 402. Despite the preferential etching, approximately 90% or more of the anodized layer 306 of the sealed colored part 300 remains subsequent to the etching process. Furthermore, the knit lines 302 may also be etched as a result of the etching process.

The upper portion 410 of the nanotubes 312 is etched to weaken the metal oxide material of the etched anodized layer 406, but not to the extent to which the nanotubes 312 collapse. In some examples, the etching process causes etching of about 1 micrometer from the external surface 202. The depth of etching may also be dependent upon the duration of the etching process. However, it should be noted that to one of ordinary skill in the art would not prolong the duration etching process at the risk of sacrificing the seal 332. Indeed, admittance testing performed on the etched colored part 250 is used to confirm the presence of the seal chemistry. In particular, admittance (as measured in accordance with ASTM B457) corresponds to an electrochemical resistance of the etched anodized layer 406. The admittance testing involves performing electrochemical impedance spectroscopy at a fixed frequency (e.g., 1 kHz). Tests show that the admittance value of the sealed colored part 300 and the etched colored part 400 are substantially equal to each other; therefore, demonstrating that the seal 332 remains intact. Other admittance testing demonstrates that the etched anodized layer 406 of the etched colored part 400 has an admittance value of greater than 30 micro Siemens, which further substantiates that the seal 332 remains intact.

FIG. 4B illustrates that pits (PT) and peaks (PK) are formed throughout the external surface 302 of the etched colored part 400. The combination of the pits (PT) and peaks (PK) may define light-absorbing features that are capable of absorbing generally all visible light incident upon the external surface 302. The light-absorbing feature (LA) cause the etched anodized layer 406 of the etched colored part 400 to absorb far more visible light than would be otherwise possible in a non-etched anodized part that was only dyed and/or electrocolored.

According to some examples, the nanotubes 312 have a diameter of on average 50 nanometers. Furthermore, the pits (PT) having bottoms of various depths that collectively define a network of nano-scale etching. The pits (PT) can be distinguished from scallops and craters that are caused by other treatments such as blasting the external surface. In particular, scallops are very shallow (i.e., <0.5 micrometers deep) and scallops have a diameter greater than 3 micrometers. However, because the scallops are so large (i.e., greater than 3 micrometers), there is insufficient spacing between adjacent scallops. As a result, the lack of spacing means that the scallops are incapable of absorbing generally all visible light incident upon the external surface as well as diffusely reflecting generally all the visible light. Furthermore, scallops and craters lack the generally circular shape that is characteristic of the pits (PT). Furthermore, a blasting process is unable to produce the fine scale etching needed to form light-absorbing features (LA).

The etched colored part 400 includes the light-absorbing features (LA) and light-absorbing material 32 that together are sufficient to impart the etched colored part 400 with a true black appearance. Accordingly, the etched anodized layer 406 having the peaks and pits may be quantified as having an extremely matte black appearance with an L* value of less than 5 using a CIE L*a*b* color space. In some examples, the etched anodized layer 406 of the etched colored part 400 has an L* value of ~1. Additionally, the etched anodized layer 406 reflects less than 1% of visible light and less than 3% of NIR light.

Figure 5:
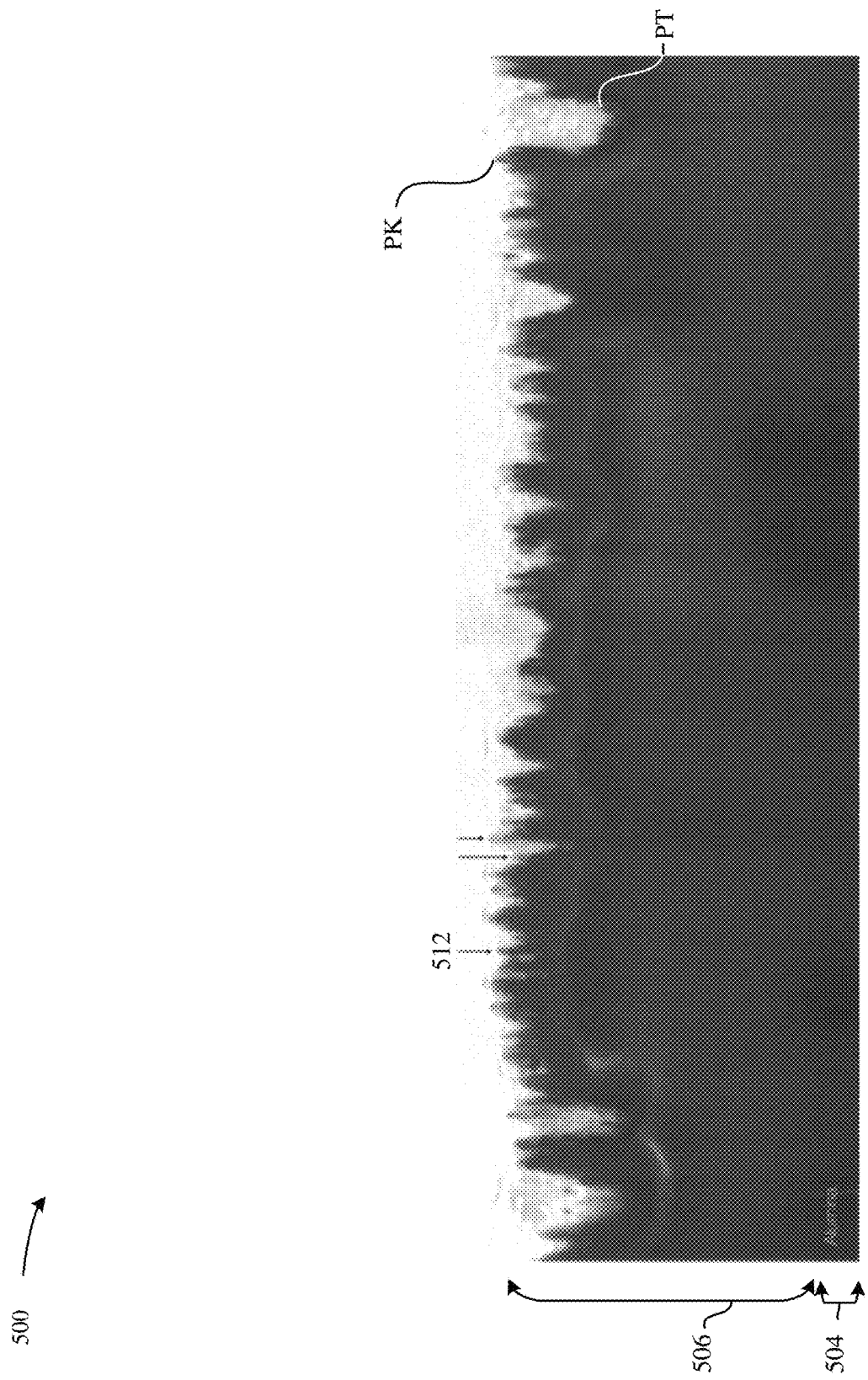
FIG. 5 illustrates an exemplary image of an etched anodized part having a light-absorbing material, in accordance with some embodiments.

FIG. 5 illustrates an exemplary focused ion beam image of an etched colored part 500, in accordance with some embodiments. As illustrated in FIG. 5, the etched colored part 500 includes an etched anodized layer 506 that overlays and is formed from a metal substrate 504. In some examples, the metal substrate 504 includes aluminum or an aluminum alloy (e.g., 6000 series alloy, 7000 series alloy). The etched anodized layer 506 includes a series of multiple peaks (PK) that are separated by pits (PT). In some examples, the tops of the pits (PK) are separated from the bottoms of the pits (PT) by a maximum separation distance of 2 micrometers or less. In some examples, these peaks (PK) and pits (PT) may span the entire surface area of the external surface of the etched anodized layer 506.

Additionally, the etched anodized layer 506 includes nanotubes 512a-c, where each of the nanotubes 512 may correspond to a peak (PK) or a pit (PT). In some examples, the peaks and pits may correspond to a light-absorbing feature. The nanotubes 512a-c may each include metal filaments that include elemental silver (Ag), copper (Cu), cobalt (Co), nickel (Ni) or tin (Sn) and are capable of absorbing visible light and NIR light. These metal filaments may refer to the light-absorbing material 222. Other examples of light-absorbing material 222 include metal oxide of the elements described above. Additionally, the nanotubes 512 may also include NIR absorbent dye 224 (e.g., organic pigment or dye).

By directing a focused beam of ions through a cross-section of the etched colored part 500, chemical and optical differences as a result of electrocoloring the nanotubes 512 with visible light and NIR light-absorbing materials are realized, as illustrated in FIG. 5. In particular, the focused ion beam image illustrates the anodized layer 506 having a true black color.

FIGS. 6A-6B illustrate various views of an etched colored part, in accordance with some embodiments. In particular, FIG. 6A illustrates a cross-sectional view of an etched colored part 600 using a focused ion beam. Additionally, FIG. 6B illustrates a magnified cross-sectional view of a portion 602 of the etched colored part 600 using a focused ion beam.

FIG. 6A illustrates an anodized layer 606 that overlays and is formed from an aluminum substrate. The anodized layer 606 includes generally columnar nanotubes 604 that extend from the external surface of the anodized layer 606 and towards the aluminum substrate. The nanotubes 604 include metal nanofilaments such as the light-absorbing material 222 or the NIR absorbent dye 224. As shown in FIG. 6A, the metal nanofilaments fill the nanotubes 604 to varied depths.

FIG. 6B illustrates a magnified cross-sectional image of a portion 602 of an upper region of the anodized layer 606. The external surface of the anodized layer 606 includes peaks (PK) separated by pits (PT). The peaks (PK) and pits (PT) define light-absorbing features along the external surface of the anodized layer 606. The combination of the light-absorbing features and the metal nanofilaments may impart the anodized layer 606 with a true black color.

Figure 7A:
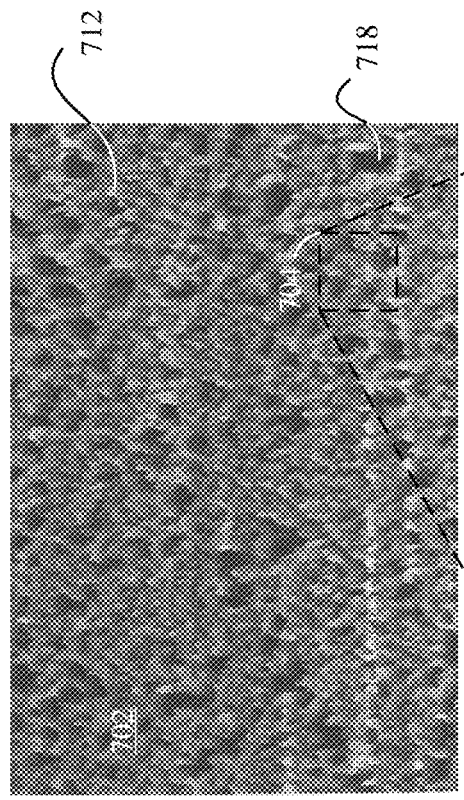
FIGS. 7A-7B illustrate various views of an etched anodized part having a light-absorbing material, in accordance with some embodiments.
Figure 7B:
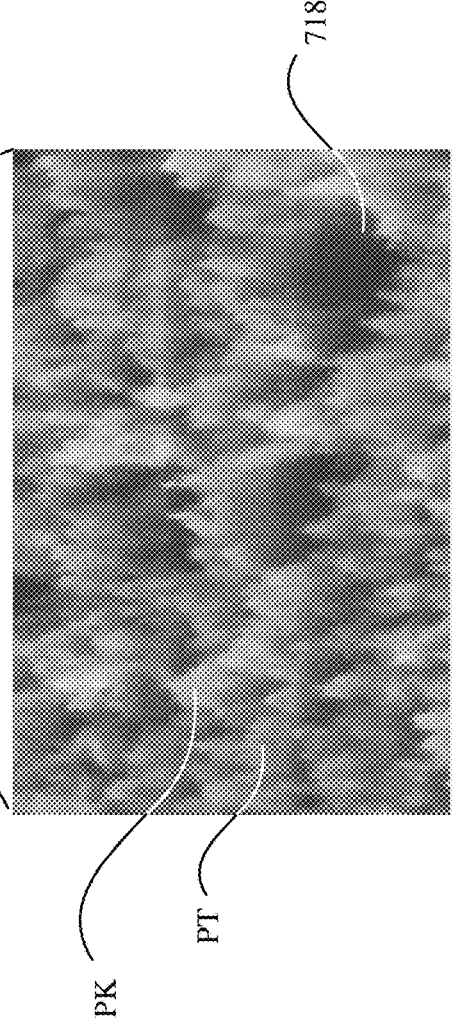

FIGS. 7A-7B illustrate exemplary electron microscope images of an etched colored part, in accordance with some embodiments. FIG. 7A illustrates a network or forest of fine-scale pits (PT) that are superimposed on an external surface 702 of an anodized layer 700 of an etched colored part. In some embodiments, the etched colored part corresponds to the etched colored part 250 and the etched colored part 400. As illustrated in FIG. 7A, the external surface 702 includes nanotubes 712 having openings 718.

FIG. 7B illustrates a magnified view of portion 704 (also illustrated in FIG. 7A) and demonstrates the extent of the etching along the external surface 702 as well as within the nanotubes 712. In particular, portion 704 of FIG. 7B illustrates numerous pits (PT) and peaks (PK) that are randomly distributed throughout the external surface 702. The pits (PT) and peaks (PK) causes the external surface 702 to diffusely reflect visible light incident thereupon. Moreover, the combination of the pits and the peaks with a visible light and NIR light-absorbing material—e.g., the light-absorbing material 222—imparts the anodized part 700 with an extremely matte true black appearance with an L* value of ~1. Additionally, the anodized layer 700 reflects less than 1% of visible light and less than 3% of NIR light.

Figure 8:
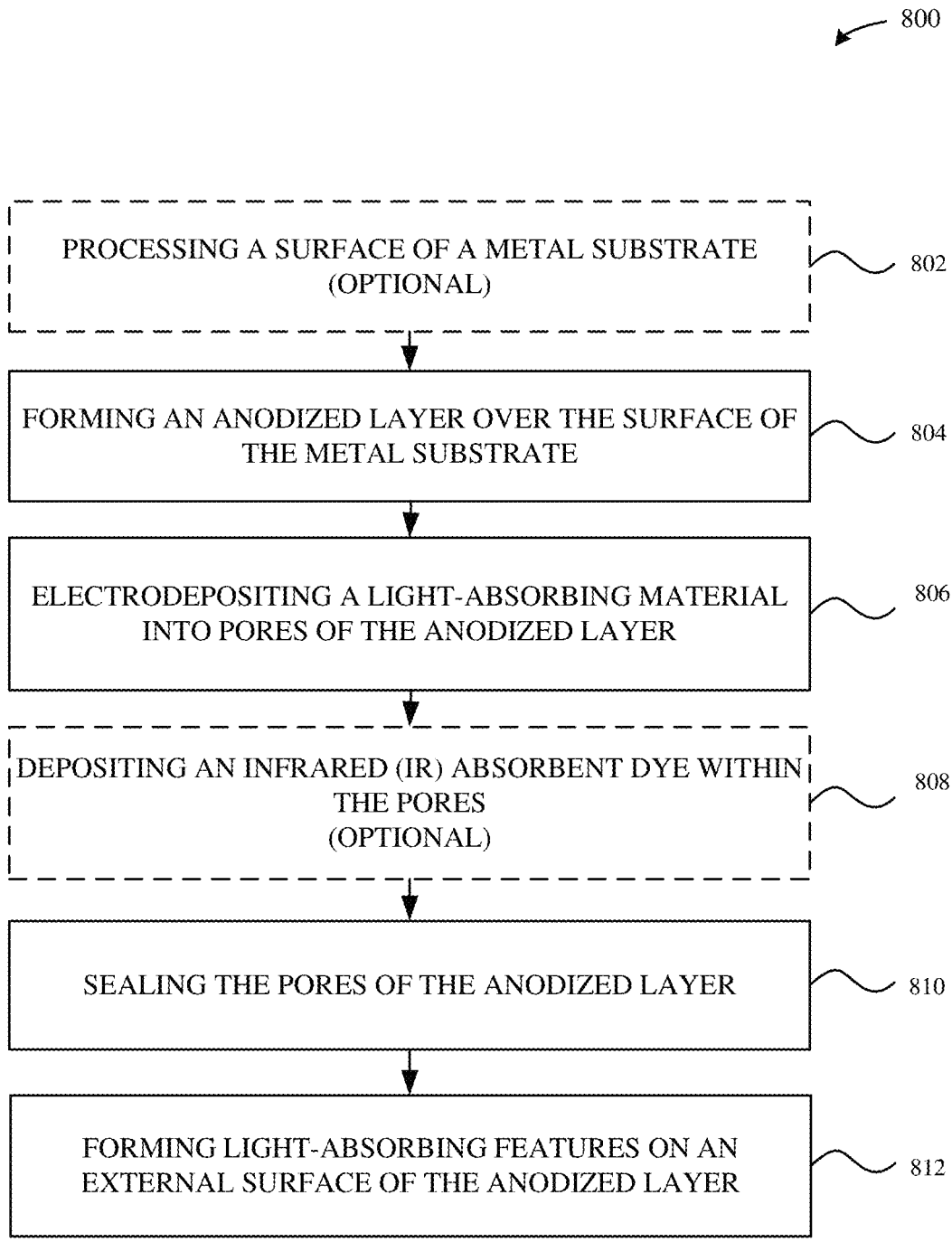
FIG. 8 illustrates a method for forming an etched anodized part having a light-absorbing material, in accordance with some embodiments.

FIG. 8 illustrates a method for forming an etched anodized part having a light-absorbing material, in accordance with some embodiments. As illustrated in FIG. 8, the method 800 optionally begins at step 802, where a surface of a metal substrate—e.g., the metal substrate 204—is optionally processed. In some examples, the surface of the metal substrate 204 is subject to a cleaning process, a texturizing process, a buffing process, a blasting process, or a polishing process.

At step 804, the metal substrate 204 is anodized to form an anodized layer—e.g., the anodized layer 206. In some examples, the anodized layer 206 may be formed through exposure to a thermal oxidation process or an electrolytic anodizing solution using sulfuric acid. Subsequent to the anodization process, the electrolytic anodizing solution may be rinsed off the external surface 202 of the anodized layer 206 with deionized water and a buffer solution. The deionized water functions to stop the chemical reaction(s) associated with the anodization process.

At step 806, the anodized layer 206 is electrocolored by electrodepositing a light-absorbing material 222 into nanotubes 212 of the anodized layer 206. In some embodiments, the light-absorbing material 222, that is a single type of light-absorbing material, is capable of absorbing nearly all visible light and NIR light. In some examples, the light-absorbing material 222 is an electrodeposited metal such as elemental silver (Ag), copper (Cu), cobalt (Co), nickel (Ni) or tin (Sn). During the electrocoloring process, the light-absorbing material 222 is electrodeposited to fill the nanotubes 212 from the terminus surface 214 and upwards resulting in an array of needle-like metal nanofilaments. The needle-like metal nanofilaments refer to the light-absorbing material 222 tapering off towards the upper portion of the anodized layer 206.

At step 808, the anodized layer 206 may be optionally processed by dyeing the anodized layer 206 with a NIR absorbent dye 224. During the dyeing process, the anodized layer 206 is exposed to water-soluble dye pigments in a dye solution bath. The dye pigments become infused within the nanotubes 212 and absorb onto the pore walls 216. Thereafter, the dye solution may be rinsed off the external surface 202 of the anodized layer 206 with deionized water and a buffer solution. The deionized water functions to stop the chemical reaction(s) associated with the dyeing process as well as to stabilize the pH value of the dye.

It should be noted that electrodepositing the light-absorbing material 222 into the nanotubes 212 in combination with etching the anodized layer 206 to form the light-absorbing features will be sufficient to impart a true black color. However, inclusion of the NIR absorbent dye 224 may further augment the absorption of NIR light resulting in a stronger true black color.

At step 810, the nanotubes 212 of the anodized layer 206 are sealed with a seal 242. In some instances, sealing the nanotubes 212 may be preferable in that the seal 242 closes the nanotubes 212 such as to prevent external contaminants from entering the nanotubes 212 and to prevent the light-absorbing material 222 from leaching out of the anodized layer 206. The sealing solution may include zinc salt (e.g., zinc acetate, etc.) such as 30 minutes in a 5 g/l nickel acetate solution at a temperature between 90° C. to 100° C. Thereafter, the sealing solution may be rinsed off the external surface 202 of the anodized layer 206 with deionized water and subsequently dried off.

At step 812, the anodized layer 206 is subject to an etching process to form an etched anodized layer 256. The etching process is associated with stochastic etching of the pore walls 216 of the nanotubes 212 that causes the nanotubes 212 to have varied heights. The stochastic etching of the pore walls 216 results in the external surface 202 of the etched anodized layer 256 having an extremely fine surface texture. The etched surface texture creates pits and peaks on the micron and sub-micron scale that define the light-absorbing features. According to some examples, the anodized layer 206 is etched in a phosphoric acid solution. In some examples, the sealed colored part 240 is exposed to an 85% phosphoric acid solution at a temperature of about 85° C. between 30 seconds to 60 seconds. Thereafter, the etching solution is rinsed off.

It should be noted that etching the sealed colored part 240 represents a non-obvious departure from conventional anodizing processes. In particular, in conventional processes, etching is not performed subsequent to the sealing process as etching the sealed colored part risks degrading the integrity of the seal 242. Furthermore, etching the anodized layer 206 may reduce the amount of the hydrated material 232 that comprises the seal 242; thereby, reducing resistance to corrosion. However, it should be noted that by limiting the etching time to no more than 60 seconds will enable the seal 242 to remain intact.

As a result of the etching process, the external surface 202 of the anodized layer 206 includes at least one light-absorbing feature (LA), where each of the light-absorbing features (LA) is defined by at least one pit (PT) and at least one peak (PK). The light-absorbing features (LA) may be super-imposed throughout generally the entire external surface 202 of the etched colored part 250. In some embodiments, the light-absorbing feature (LA) is capable of absorbing generally all visible light and NIR light incident upon the external surface 202. Moreover, whatever visible light not absorbed by the light-absorbing features is diffusely reflected by the light-absorbing feature (LA).

Figure 9:
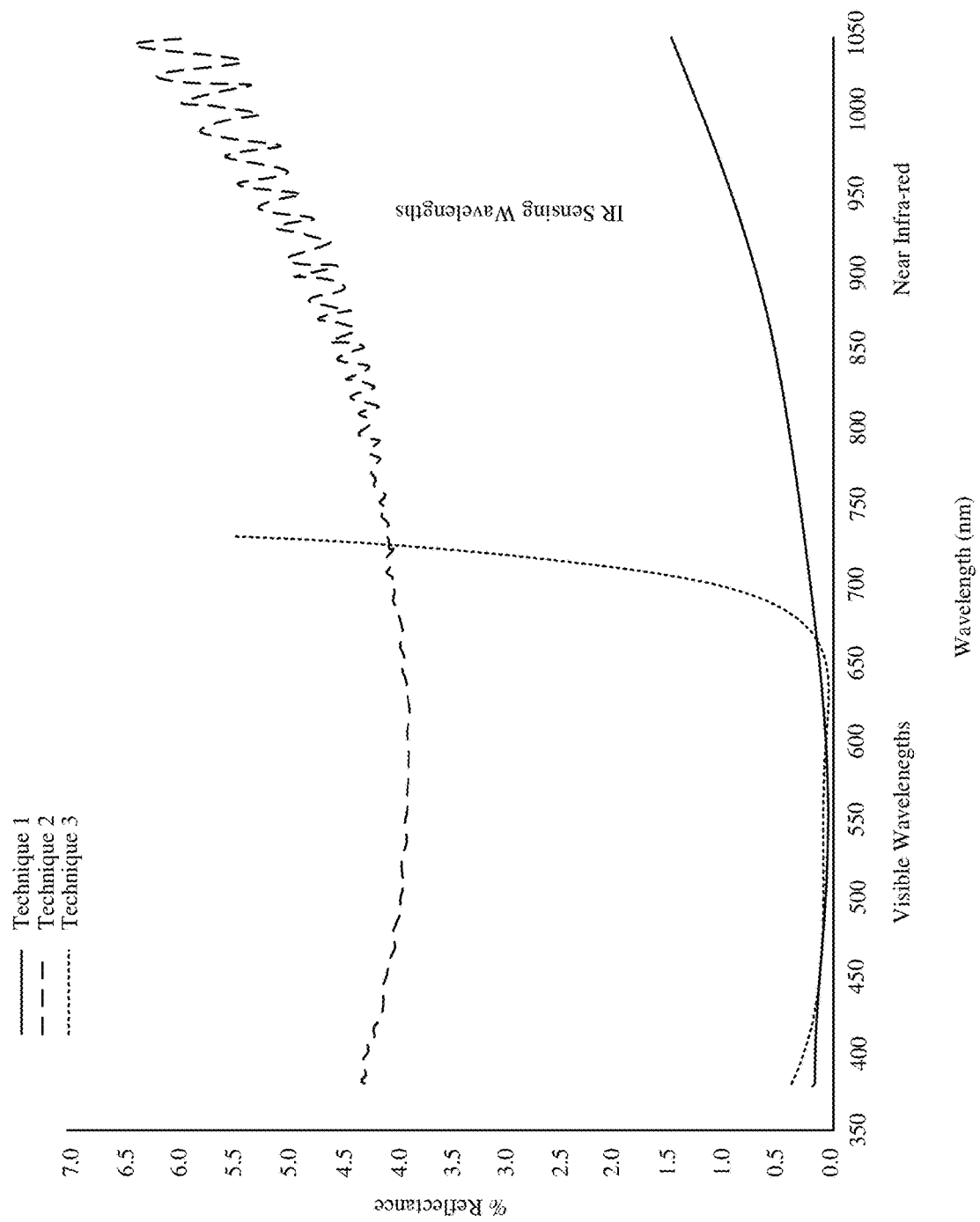
FIG. 9 illustrates an exemplary graph that indicates a relationship of visible and NIR light specular reflectance % of anodized parts processed using various techniques, in accordance with some embodiments.

FIG. 9 illustrates an exemplary graph that indicates a relationship of visible and NIR light specular reflectance % of anodized parts processed using various techniques, in accordance with some embodiments. According to some examples, anodized parts were processed using the combination of electrocoloring the anodized layer with the light-absorbing material 222 and followed by etching the anodized layer to form light-absorbing features, hereinafter referred to as "Technique 1." As illustrated in FIG. 9, the anodized parts processed using Technique 1 exhibit visible light (i.e., 400 nm to 700 nm) specular reflectance of less than 1% and NIR light (i.e., 800 nm to 1000 nm) specular reflectance of less than 2%.

According to some examples, anodized parts were processed using a combination of dyeing nanotubes with a dye followed by etching the anodized layer, hereinafter referred to as "Technique 2." As illustrated in FIG. 9, the anodized parts processed using Technique 2 fail to exhibit any absorption of NIR light (i.e., 800 nm to 1000 nm).

According to some examples, anodized parts were processed by electrodepositing a metal into the nanotubes, hereinafter referred to as "Technique 3." As illustrated in FIG. 9, the anodized parts processed using Technique 3 exhibit visible light (i.e., 400 nm to 700 nm) specular reflectance of at least 4% or greater and NIR light (i.e., 800 nm to 1000 nm) specular reflectance of at least 5%.

It should be noted by those of ordinary skill in the art that the combination of electrocoloring the anodized layer with the light-absorbing material 222 and etching the anodized layer to form the light-absorbing features provides significantly improved absorption of visible and NIR light than either of these techniques in isolation. Furthermore, this combination of electrocoloring and etching imparts significantly improved visible light and NIR light absorption than best-in-class black paints or inks.

Figure 10:
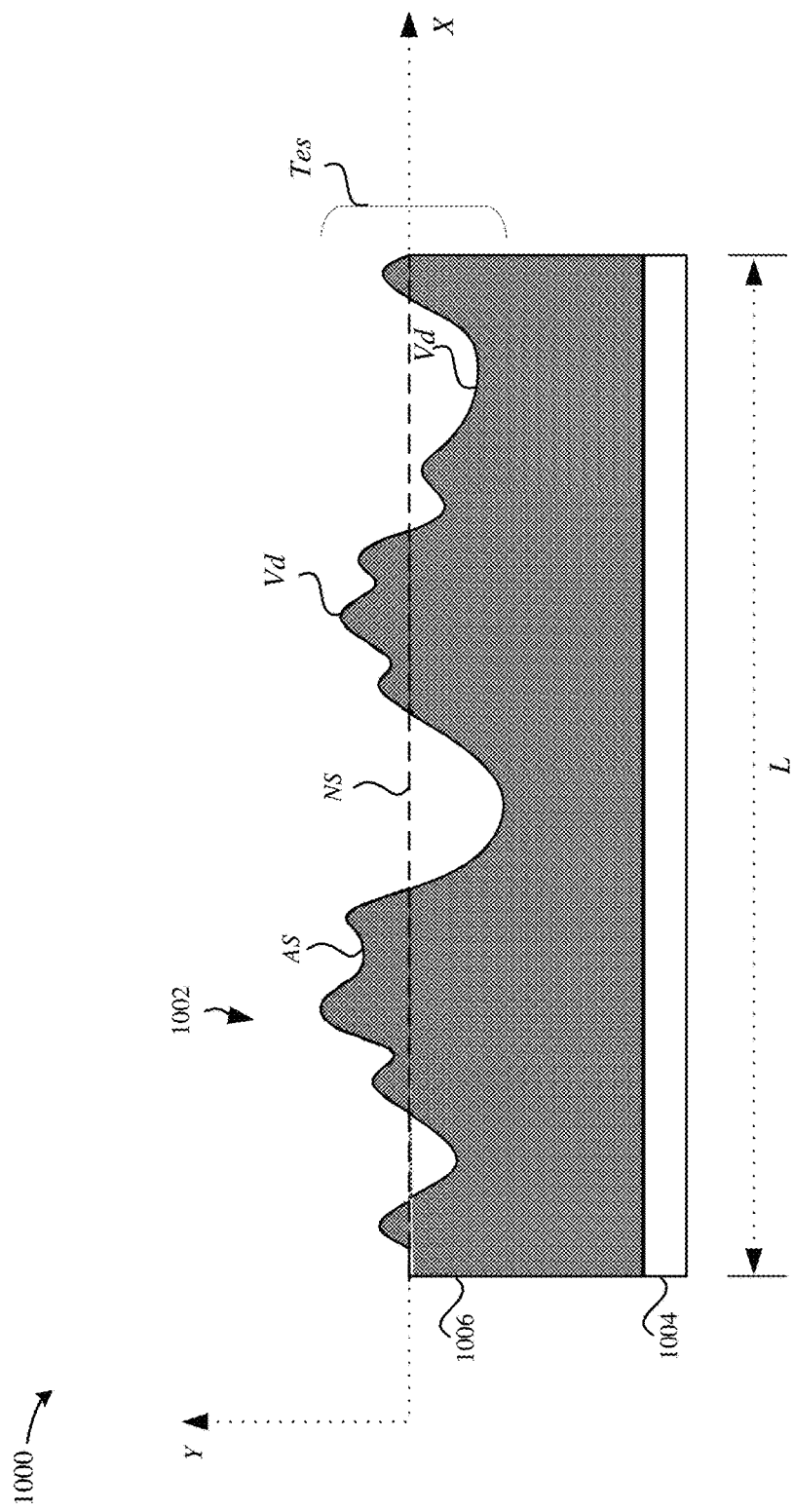
FIG. 10 illustrates an exemplary diagram of an etched anodized part, in accordance with some embodiments.

FIG. 10 illustrates an exemplary diagram of an etched anodized part 1000, in accordance with some embodiments. In particular, in some examples, the etched anodized part 1000 may correspond to any one of the etched anodized parts described herein, including the etched colored part 250 or the etched colored part 400. As described above, any one of these etched anodized parts may include peaks and valleys (also may be referred to as pits) along an actual surface (AS), which are defined as vertical deviations (Vd) from a nominal surface (NS) of the etched metal part. The vertical deviations (Vd) over the nominal surface (NS) occur over a specified length (L) over the etched anodized part. The vertical deviations (Vd) can include positive vertical deviations that extend above the nominal surface (NS) and negative vertical deviations that extend below the nominal surface (NS). The positive vertical deviations are in the form of peaks and the negative vertical deviations are in the form of valleys. The nominal surface (NS) refers to a planar surface that is exclusive of any intended surface roughness or contours. FIG. 10 illustrates the etched anodized part 1000 having an anodized layer 1006 overlaying and formed from a metal substrate 1004. The external surface of the etched anodized part 1000 includes an external surface 1002 having peaks and pits. In some embodiments, the external surface of the anodized layer 1006 includes a maximum positive vertical deviation separated from a maximum negative vertical deviation by 2 micrometers or less.

In some embodiments, the anodized layer 1006 of the etched anodized part 1000 may be described as having a thickness (Tes). The thickness (Tes) may span between the maximum and negative vertical deviations of the etched external surface. The anodized layer 1006 may also have a mean thickness value. The anodized layer 1006 may include peaks characterized as having positive vertical deviations of the mean thickness value and troughs characterized as having negative vertical deviations of the mean thickness value. The mean thickness value may be greater than the maximum positive vertical deviation and/or greater than the maximum negative vertical deviation. In some examples, the thickness (Tes) is 2 micrometers or less.

Any ranges cited herein are inclusive. The terms "substantially", "generally," and "about" used herein are used to describe and account for small fluctuations. For example, they can refer to less than or equal to ±5%, such as less than or equal to ±2%, such as less than or equal to ±1%, such as less than or equal to ±0.5%, such as less than or equal to ±0.1%.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An enclosure for a portable electronic device, the enclosure comprising:
    a metal substrate; and
    an anodized layer overlaying the metal substrate and including pores having a near-infrared (NIR) light-absorbing material and a sealing material therein, wherein the NIR light-absorbing material occupies between ¼ to ⅔ of the length of the pores, wherein an average specular reflectance of NIR light that is incident upon an external surface of the anodized layer is less than 3%, and wherein a top surface of a pore wall of a first pore of the pores is disposed at a level above a top surface of the sealing material over a second pore of the pores.

2. The enclosure of claim 1, wherein the external surface includes randomly distributed light-absorbing features.

3. The enclosure of claim 2, wherein the randomly distributed light-absorbing features correspond to peaks separated by valleys.

4. The enclosure of claim 1, wherein the pores are sealed by the sealing material.

5. The enclosure of claim 1, wherein the anodized layer, using a CIE L*a*b* color space, has an L* value of less than 10.

6. The enclosure of claim 1, wherein the NIR light-absorbing material includes at least one of a metal, a metal oxide, a dye or an organic pigment.

7. The enclosure of claim 1, wherein the NIR light-absorbing material is capable of absorbing visible light that is incident upon the external surface.

8. An enclosure for a portable electronic device, the enclosure comprising:
    a substrate; and
    an anodized layer having a mean thickness value and pores that include a NIR light-absorbing material and a sealing material overlying the NIR light-absorbing material, wherein the pores are characterized as having a length, and the NIR light-absorbing material occupies between ¼ to ⅔ of the length of the pores, and wherein the anodized layer includes:
    (i) a peak that corresponds to a maximum positive deviation from the mean thickness value,
    (ii) a trough that corresponds to a maximum negative deviation from the mean thickness value, wherein a separation between the peak and the trough is 2 micrometers or less, and
    (iii) a top surface of a pore wall of a first pore of the pores that is disposed at a level higher than a top surface of the sealing material over a second pore of the pores.

9. The enclosure of claim 8, wherein the anodized layer, using a CIE L*a*b* color space, has an L* value that is less than 5.

10. The enclosure of claim 8, wherein the anodized layer is characterized as having an average specular reflectance of NIR light that is incident upon an external surface of the anodized layer of less than 3%.

11. The enclosure of claim 10, wherein the anodized layer is characterized as having an average specular reflectance of visible light that is incident upon the external surface of the anodized layer of less than 1%.

12. The enclosure of claim 8, wherein the pores are sealed by the sealing material.

13. The enclosure of claim 8, wherein the NIR light-absorbing material includes at least one of a metal, a metal oxide, a dye or an organic pigment.

14. A method for forming an enclosure for a portable electronic device, the enclosure including a metal substrate, the method comprising:
    forming an anodized layer that overlays the metal substrate, wherein the anodized layer includes pores;
    electrodepositing a light-absorbing compound within the pores, the light-absorbing compound occupying between ¼ to ⅔ of the length of the pores;
    depositing a sealing material within the pores; and forming light-absorbing features on an external surface of the anodized layer by etching the external surface, wherein etching the external surface etches a top surface of the sealing material over a first pore of the pores to a level below a top surface of a pore wall of a second pore of the pores.

15. The method of claim 14, wherein, prior to forming the light-absorbing features, the method further comprises:
sealing the pores by depositing the sealing material within the pores.

16. The method of claim 15, wherein, prior to sealing the pores, the method further comprises:
depositing a NIR light-absorbing dye within the pores.

17. The method of claim 16, wherein the NIR light-absorbing dye includes tin.

18. The method of claim 14, wherein the light-absorbing features correspond to peaks separated by pits.

19. The method of claim 14, wherein an average specular reflectance of NIR light that is incident upon an external surface of the anodized layer is less than 3%.

* * * * *